United States Patent
Lee et al.

(10) Patent No.: US 12,348,570 B2
(45) Date of Patent: Jul. 1, 2025

(54) SECURITY REQUIREMENT RECOMMENDATION SYSTEM AND OPERATION METHOD

(71) Applicant: AJOU UNIVERSITY INDUSTRY-ACADEMIC COOPERATION FOUNDATION, Suwon-si (KR)

(72) Inventors: Seok Won Lee, Suwon-si (KR); Ji Wook Jung, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 152 days.

(21) Appl. No.: 18/074,938

(22) Filed: Dec. 5, 2022

(65) Prior Publication Data

US 2023/0179639 A1 Jun. 8, 2023

(30) Foreign Application Priority Data

Dec. 3, 2021 (KR) ............. 10-2021-0171953

(51) Int. Cl.
*G06F 21/57* (2013.01)
*H04L 9/40* (2022.01)

(52) U.S. Cl.
CPC ........ *H04L 63/205* (2013.01); *H04L 63/1425* (2013.01); *H04L 63/1441* (2013.01)

(58) Field of Classification Search
CPC ............. H04L 63/205; H04L 63/1425; H04L 63/1441
USPC .................................... 726/1, 22, 25
See application file for complete search history.

(56) References Cited

U.S. PATENT DOCUMENTS

| | | | | |
|---|---|---|---|---|
| 9,330,263 | B2* | 5/2016 | Cabrera | H04L 63/1425 |
| 11,477,245 | B2* | 10/2022 | Crabtree | H04L 63/1425 |
| 12,034,743 | B2* | 7/2024 | Tyagi | H04L 63/1425 |
| 2017/0243009 | A1* | 8/2017 | Sejpal | G06F 21/577 |
| 2019/0354690 | A1* | 11/2019 | Brigandi | H04L 63/1425 |
| 2020/0128047 | A1* | 4/2020 | Biswas | H04L 63/1425 |
| 2022/0303300 | A1* | 9/2022 | Egan | H04L 63/1416 |
| 2023/0177613 | A1* | 6/2023 | Crabtree | H04L 63/14 705/36 R |

FOREIGN PATENT DOCUMENTS

KR 10-2021-0064857 A 6/2021

\* cited by examiner

*Primary Examiner* — Bharat Barot
(74) *Attorney, Agent, or Firm* — Bridgeway IP Law Group, PLLC; Sang Ho Lee; Hyun Woo Shin

(57) ABSTRACT

Provided is an operation method of a security requirement recommendation system including inputting an attack scenario of an advanced persistent threat (APT); and estimating a specific APT attack case similar to the attack scenario based on a case-based problem domain ontology including characteristic models of the APT attack cases, and recommending a security requirement corresponding to the specific APT attack case.

13 Claims, 4 Drawing Sheets

| Attach Elements | | Software & Techniques |
|---|---|---|
| Software | | S0029:PsExec. |
| | | S0108:netsh. |
| Cyber Kill Chain | Reconnaissance | T1589:Gather_Viotim_identity_Information. |
| | Delivery | T1566.001:Phishing:Spearphishing_Attachment. |
| | Exploitation | T1059.003:Commad_and_Scripting_Interpreter:Windows_Command_Shell. |
| | Command &Control | T1219:Remote_Access_Software. |
| | Operation | T1078:Valid_Accounts. <br> T1003:OS_Sredential_Dumping. <br> T1021.001:Remote_Services:Remote_Desktop_Protocol. |
| | Action on Objective | T1030:Data_Transfer_Size_Limits. |
| Tactic | Discovery | T1082:System_Information_Discovery. <br> T1057:Process_Discovery. |
| | Command &Control | T1105:Ingress_Tool_Transfer. |
| | Execution | T1059.003:Command_and_Scirpting_Interpreter:Window_Command_Shell. <br> T1559.001:Inter-Process_Communication:Component_Objeck_Model. |
| | Collection | T1113:Screen_Capture. |
| | Exfiltration | T1041:Exfiltration_Over_C2_Channel. |

FIG. 2

SECURITY REQUIREMENT RECOMMENDATION SYSTEM AND OPERATION METHOD

CROSS-REFERENCE TO RELATED APPLICATIONS

This application claims the priority of Korean Patent Application No. 10-2021-0171953 filed on Dec. 3, 2021, in the Korean Intellectual Property Office, the disclosure of which is incorporated herein by reference.

BACKGROUND

Field

The present disclosure relates to a security requirement recommendation system and an operation method thereof, and more particularly, to a security requirement recommendation system which analyzes an attack from an attack scenario based on a case-based reasoning technique to easily extract security requirement information in response to a past attack scenario matching the attack scenario and an operation method thereof.

Description of the Related Art

Cyber threats have arisen and have evolved along with the development of the networks and the Internet. The cyber threats have constantly attacked governments and corporates depending on the attacker's purpose and thus many countermeasures to deal with the cyber threats have been discussed.

However, in response to the governments and corporates spending a lot of effort and money, the cyber threats are also evolving more intelligently so the security issues are constantly occurring.

The advanced persistent threat (APT) is one of the most prominent threats among these security issues.

The advanced persistent threat (APT) is an advanced cyber threat method which sneakingly invades to destroy a system of an attack target or leak information by means of a technique specialized to the attack target through a thorough investigation. The advanced persistent threat does not indicate a specific technology, but is a technique of attacking a specific target using various techniques so that various techniques are used according to an attack purpose and an attack target and more evolved technologies are used. Accordingly, it is difficult to defend the advanced persistent threat.

The advanced persistent threats have problems such as enormous damages applied to the government agencies and companies, the difficulty to analyze due to the complex and covert nature of the attack, and the difficulty to easily suggest defense measures.

Specifically, most of the preceding studies for defense against the advanced persistent threat have been focused on detection of the attack penetration.

However, once penetrated, this approach is too late to protect the property of the attack target and it needs to be built proactively before building the system. However, studies to derive security requirements for cyberattacks or the advanced persistent threats are not being actively conducted.

As mentioned above, the studies are focused on detection of the penetration so that there is also the absence of data to proactively build a security system. Numbers which are recorded in the system, such as event logs or access time of the operating system are utilized as data, but this method is focused only on the software, but contains flaws in the human factor.

Numerous requirements for deriving and applying the security requirements are scattered so that it is difficult for security experts or users to select and apply appropriate requirements and it takes a lot of time for this process.

Recently, a method for effectively analyzing the advanced persistent threat to recommend appropriate requirements is being studied.

SUMMARY

An object of the present disclosure is to provide a security requirement recommendation system which analyzes an attack from an attack scenario based on a case-based reasoning technique to easily extract security requirement information in response to a past attack scenario matching the attack scenario and an operation method thereof.

The object of the present disclosure is not limited to the above-mentioned objects and other objects and advantages of the present disclosure which have not been mentioned above can be understood by the following description and become more apparent from exemplary embodiments of the present disclosure. Further, it is understood that the objects and advantages of the present disclosure may be embodied by the means and a combination thereof in the claims.

According to an aspect of the present disclosure, an operation method of a security requirement recommendation system may include inputting an attack scenario of an advanced persistent threat (APT); and estimating a specific APT attack case similar to the attack scenario based on a case-based problem domain ontology including characteristic models of the APT attack cases and recommending a security requirement corresponding to the specific APT attack case.

The characteristic models of the APT attack cases may include an attack component model including information about attacks of the APT attack cases, a security requirement component model including security requirement information defined in each of the APT attack cases, a risk component model including weakness components by the APT attack cases, and a domain component model including an element of the attack target.

The recommending of a security requirement may include: extracting an attack component by applying the attack scenario to the attack component model; measuring a similarity between the attack component and an attack component of each of the APT attack cases; listing attack target candidates in an order of higher similarities; estimating the specific APT attack case for the attack target candidates by analyzing the attack target candidates with the security requirement component model, the risk component model, and the domain component model; and extracting the security requirement corresponding to the specific APT attack case.

In the measuring of a similarity, the similarity may be measured by assigning a weight to a sibling/parent relationship characteristic, a platform performance characteristic, a tactical target characteristic, and an attack pattern characteristic between the attack component and an attack component of each of the APT attack cases.

The similarity may be measured by Jaccard similarity.

According to an aspect of the present disclosure, a security requirement recommendation system may include an input device which inputs an attack scenario of an advanced persistent threat (APT); an ontology server in which a case-based problem domain ontology including characteristic models of APT attack cases is stored; and a security requirement recommendation device which estimates a specific APT attack case similar to the attack scenario based on the case-based problem domain ontology and recommends the security requirement corresponding to the specific APT attack case.

The characteristic models of the APT attack cases may include an attack component model including information about attacks of the APT attack cases, a security requirement component model including security requirement information defined in each of the APT attack cases, a risk component model including weakness components by the APT attack cases, and a domain component model including an element of the attack target.

The security requirement recommendation device may include: a component extraction unit which extracts an attack component by applying the attack scenario to the attack component model; a similarity measurement unit which measures a similarity between the attack component and an attack component of each of the APT attack cases and lists attack target candidates in an order of higher similarities; and a security requirement extraction unit which analyzes the attack target candidates with the security requirement component model, the risk component model, and the domain component model to estimate the specific APT attack case for the attack target candidates and extract the security requirement corresponding to the specific APT attack case.

The similarity measurement unit may measure the similarity by assigning a weight to a sibling/parent relationship characteristic, a platform performance characteristic, a tactical target characteristic, and an attack pattern characteristic between the attack component and an attack component of each of the APT attack cases.

The similarity may be measured by Jaccard similarity.

The security requirement recommendation system and an operation method thereof according to the present disclosure have advantages of being able to establish preemptive security measures against the advanced persistent threat (APT) which uses the complex technologies and tactics and recommend necessary security requirements.

The effects of the present disclosure are not limited to the aforementioned effects, and various other effects are included within a range which is obvious to those skilled in the art from the following description.

BRIEF DESCRIPTION OF THE DRAWINGS

The above and other aspects, features and other advantages of the present disclosure will be more clearly understood from the following detailed description taken in conjunction with the accompanying drawings, in which:

FIG. 2 is an exemplary diagram illustrating an example of an attack scenario input from an input device illustrated in FIG. 1;

DETAILED DESCRIPTION OF THE EMBODIMENT

Figure 1:
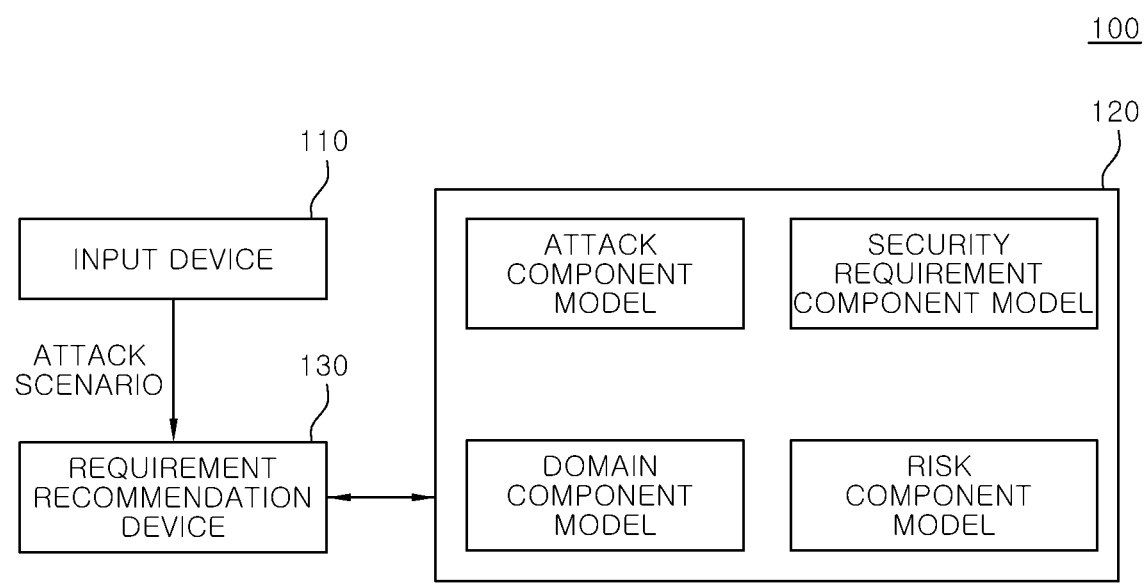
FIG. 1 is a system block diagram illustrating a configuration of a security requirement recommendation system according to the present disclosure.

Those skilled in the art may make various modifications to the present disclosure and the present disclosure may have various embodiments thereof, and thus specific embodiments will be described in detail with reference to the drawings. However, this does not limit the present disclosure within specific exemplary embodiments, and it should be understood that the present disclosure covers all the modifications, equivalents, and replacements within the spirit and technical scope of the present disclosure. In the description of respective drawings, similar reference numerals designate similar elements.

Terms such as first, second, A, or B may be used to describe various components but the components are not limited by the above terms. The above terms are used only to distinguish one component from the other component. For example, without departing from the scope of the present disclosure, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

Terms used in the present application are used only to describe a specific exemplary embodiment, but are not intended to limit the present disclosure. A singular form may include a plural form if there is no clearly opposite meaning in the context. In the present application, it should be understood that terminology "include" or "have" indicates that a feature, a number, a step, an operation, a component, a part, or the combination thereof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

In the specification and the claim, unless explicitly described to the contrary, the word "comprise" and variations such as "comprises" or "comprising", will be understood to imply the inclusion of stated elements but not the exclusion of any other elements.

Hereinafter, exemplary embodiments according to the present disclosure will be described in detail with reference to accompanying drawings.

Figure 3:
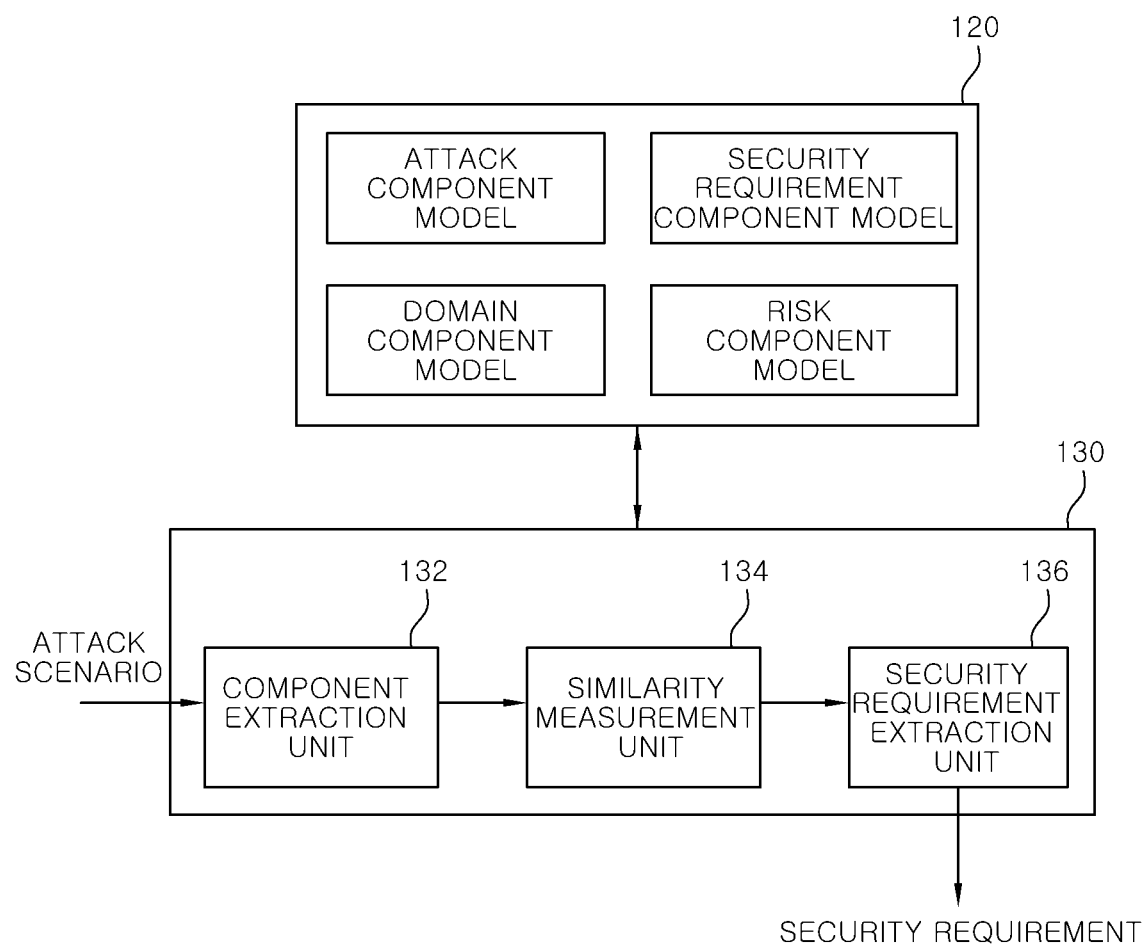
FIG. 3 is a control block diagram illustrating a control configuration of a security requirement recommendation device illustrated in FIG. 1.

FIG. 1 is a system block diagram illustrating a configuration of a security requirement recommendation system according to the present disclosure. FIG. 2 is an exemplary diagram illustrating an example of an attack scenario input from an input device illustrated in FIG. 1. FIG. 3 is a control block diagram illustrating a control configuration of a security requirement recommendation device illustrated in FIG. 1.

Referring to FIGS. 1 and 2, the security requirement recommendation system 100 may include an input device 110, an ontology server 120, and a security requirement recommendation device 130.

The input device 110 may input an attack scenario of the advanced persistent threat (hereinafter, abbreviated as "APT").

The attack scenario may include an attack which has been attempted before or is expected to be attempted and include various attack components.

Here, FIG. 2 illustrates an example of the attack scenario and it will be described below with reference to FIG. 2.

The attack components may include attack targets, objects, software, techniques, tactics, and cyber kill chains, and the attack targets, the objects, and the software are input as general information and the techniques are input according to the characteristic of the tactics and the cyber kill chains, but are not limited thereto.

In the ontology server 120, a case-based problem domain ontology including characteristic models of APT attack cases may be stored.

Here, the characteristic models of the APT attack cases may include an attack component model including information about attacks of the APT attack cases, a security requirement component model including security requirement information defined in each of the APT attack cases, a risk component model including weakness components by the APT attack cases, and a domain component model including an element of the attack target.

That is, the attack component model may include information about the attack, such as software, techniques, attack groups, attack tactics, and attack patterns which are used for each of the APT attack cases.

Further, the security requirement component model may include a list of previously defined security requirements, security goals, and malicious goals to be achieved by the attack groups.

The risk component model may include a malicious goal to be achieved by the attack group of each of the APT attack cases and the domain component model may be configured by business & process, human, physical, technical layers to arrange the elements of the attack target.

Here, the domain component model may further include corporate assets, operating security measures, security goals applied to the assets, and human asset information as information of institutions/knowledge, but is not limited thereto.

The security requirement recommendation device 130 may include a component extraction unit 132, a similarity measurement unit 134, and a security requirement extraction unit 136.

The component extraction unit 132 may extract attack components included in the attack scenario based on the attack component model stored in the ontology server 120.

That is, the attack component may be a component corresponding to information about the attack, such as software, techniques, attack groups, attack tactics, and attack patterns which are included in the attack component model in the attack scenario.

The similarity measurement unit 134 may measure a similarity between the attack component extracted from the component extraction unit 132 and the attack component of each of the APT attack cases and make a list of attack target candidates in the order of higher similarities.

Here, the similarity measurement unit 134 may use various methods such as Jaccard, Euclid, TF-IDF, passive detection and selection to measure the similarity.

The similarity measurement unit 134 may reflect a similarity measurement weight of the attack component and use the Jaccard similarity measurement method.

The Jaccard similarity used in the exemplary embodiment is one of methods used to measure a similarity of two sets and is defined by "size of intersection/union" and may measure the similarity with respect to the software, the technique, the attack group, the attack tactic, and the attack pattern included in the attack component model to list the attack target candidates in the order of higher similarities.

The similarity measurement unit 134 may measure the similarity by assigning a weight to a sibling/parent relationship characteristic, a platform performance characteristic, a tactical target characteristic, and an attack pattern characteristic between the attack component and the attack component of each of the APT attack cases.

Here, the sibling/parent relationship characteristic, the platform performance characteristic, the tactical target characteristic, and the attack pattern characteristic may be defined in advance based on the APT attack cases to measure the similarity.

The similarity measurement unit 134 may assign a weight depending on the satisfying number of the sibling/parent relationship characteristic, the platform performance characteristic, the tactical target characteristic, and the attack pattern characteristic to measure the similarity.

For example, the similarity measurement unit 134 may set an initial weight for each of the sibling/parent relationship characteristic, the platform performance characteristic, the tactical target characteristic, and the attack pattern characteristic to 0.25 and obtain a weight matrix calculated as represented in Table 1.

TABLE 1

|      | T1  | T2   | T3   |
| ---- | --- | ---- | ---- |
| T'1  | 0   | 0.25 | 0    |
| T'2  | 0.5 | 0.25 | 0.25 |
| T'3  | 0   | 0.75 | 0.25 |
| T'4  | 0   | 0    | 0    |

Here, T'1, T'2, T'3, and T'4 are attack components and T1, T2, and T3 are attack components of the APT attack cases, respectively.

In brief, in Table 1, 0.25 which is the weight initially set according to the satisfying number of the sibling/parent relationship characteristic, the platform performance characteristic, the tactical target characteristic, and the attack pattern characteristic is added between T'1 and T1, T2, and T3 to determine the weight of T'1.

Here, when the user applies the weight for the attack scenario, the initial weight may be adjusted in consideration of the operating environment or domain, but is not limited thereto.

In the exemplary embodiment, even though it has been described that the similarity measurement unit 134 applies the Jaccard similarity and the weight to measure the similarity, the similarity may be measured with the Jaccard similarity and one of above-described two methods may be selected as the method for measuring the similarity according to the selection of the user.

However, when only the Jaccard similarity is applied, the similarity measurement unit 134 may identify a specific APT attack case matching the attack scenario, among the APT attack cases.

When the Jaccard similarity and the weight are applied, the similarity measurement unit 134 may also identify the similarity for the technology which considers attributes of the specific APT attack case and the attack technology as described above.

Here, the similarity measurement unit 134 may output the similarity for the technology that the attack technology considers an attribute on the graph, but is not limited thereto.

The security requirement extraction unit 136 may analyze the attack target candidates with the security requirement component model, the risk component model, and the domain component model to estimate the specific APT attack case for the attack target candidates and extract the security requirement corresponding to the specific APT attack case.

That is, the security requirement extraction unit 136 may estimate the specific APT attack case corresponding to the attack target candidates, for example, the attack purpose, the malicious goal, the technology/human weakness, and attack methods defined by the APT attack cases included in the domain component model.

Thereafter, the security requirement extraction unit 136 may extract the security requirement corresponding to the specific APT attack case to transmit the security requirement to external devices, for example, devices used by security experts or security officers of the corporates/institutions.

Figure 4:
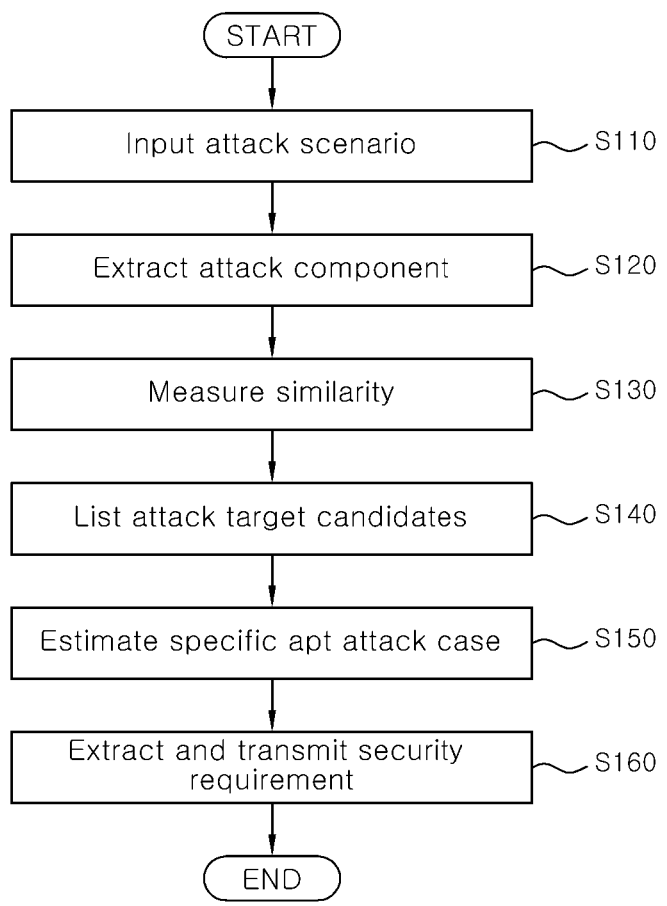
FIG. 4 is a flowchart illustrating an operation method of a security requirement recommendation system according to the present disclosure.

FIG. 4 is a flowchart illustrating an operation method of a security requirement recommendation system according to the present disclosure.

Referring to FIG. 4, the input device 110 of the security requirement recommendation system 100 may input an attack scenario of the advanced persistent threat (APT) in S110.

The security requirement recommendation device 130 of the security requirement recommendation system 100 may apply the attack scenario to the attack component model to extract an attack component in S120.

That is, the security requirement recommendation device 130 may extract the attack component based on the case-based problem domain ontology including characteristic models of the APT attack cases stored in the ontology server 120.

Here, the characteristic models of the APT attack cases may include an attack component model including information about attacks of the APT attack cases, a security requirement component model including security requirement information defined in each of the APT attack cases, a risk component model including weakness components by the APT attack cases, and a domain component model including an element of the attack target.

The attack component may be components corresponding to information about the attack, such as software, techniques, attack groups, attack tactics, and attack patterns which are included in the attack component model in the attack scenario.

The security requirement recommendation device 130 may measure the similarity between the attack component and the attack component of the APT attack case in S130 and list the attack target candidates in the order of higher similarities in S140.

That is, the security requirement recommendation device 130 may reflect the similarity measurement weight of the attack component and use the Jaccard similarity measurement method to measure a similarity between the attack component and the attack component of each of the APT attack cases.

The security requirement recommendation device 130 measures the similarity by assigning a weight to a sibling/parent relationship characteristic, a platform performance characteristic, a tactical target characteristic, and an attack pattern characteristic between the attack component and the attack component of each of the APT attack cases.

Here, the sibling/parent relationship characteristic, the platform performance characteristic, the tactical target characteristic, and the attack pattern characteristic may be defined in advance based on the APT attack cases to measure the similarity.

The security requirement recommendation device 130 may analyze the attack target candidates with the security requirement component model, the risk component model, and the domain component model to estimate the specific APT attack case for the attack target candidates in S150.

Thereafter, the security requirement recommendation device 130 may extract the security requirement corresponding to the specific APT attack case to transmit the security requirement to the external device in S160.

That is, the security requirement recommendation device 130 may analyze the attack target candidates with the security requirement component model, the risk component model, and the domain component model to estimate the specific APT attack case for the attack target candidates and extract the security requirement corresponding to the specific APT attack case.

The security requirement recommendation device 130 may estimate the specific APT attack case corresponding to the attack target candidates, for example, the attack purpose, the malicious goal, the technology/human weakness, and attack methods defined by the APT attack cases included in the domain component model.

Thereafter, the security requirement recommendation device 130 may extract the security requirement corresponding to the specific APT attack case to transmit the security requirement to external devices, for example, devices used by security experts or security officers of the corporates/institutions.

The features, structures, effects and the like described in the foregoing embodiments are included in at least one embodiment of the present disclosure and are not necessarily limited to one embodiment. Moreover, the features, structures, effects and the like illustrated in each embodiment may be combined or modified by those skilled in the art for the other embodiments to be carried out. Therefore, the combination and the modification of the present disclosure are interpreted to be included within the scope of the present disclosure.

It will be appreciated that various exemplary embodiments of the present disclosure have been described herein for purposes of illustration, and that various modifications, changes, and substitutions may be made by those skilled in the art without departing from the scope and spirit of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. An operation method of a security requirement recommendation system, comprising:
inputting an attack scenario of an advanced persistent threat (APT);
estimating a specific APT attack case similar to the attack scenario based on a case-based problem domain ontology including characteristic models of APT attack cases; and
recommending a security requirement corresponding to the specific APT attack case, the recommending having:
extracting a specific attack component by applying the attack scenario to an attack component model,
measuring a similarity between the specific attack component and each attack component of each of the APT attack cases,
listing attack target candidates in an order of greater similarities,
estimating the specific APT attack case for the attack target candidates by analyzing the attack target candidates with a security requirement component model, a risk component model, and a domain component model, and
extracting the security requirement corresponding to the specific APT attack case.

2. The operation method of claim 1, wherein the characteristic models of the APT attack cases include:
the attack component model including information about attacks of the each of the APT attack cases;
the security requirement component model including a security requirement information defined in the each of the APT attack cases;
the risk component model including weakness components by the APT attack cases; and
the domain component model including an element of an attack target.

3. The operation method of claim 1, wherein the similarity is measured by assigning a weight to a sibling/parent relationship characteristic, a platform performance characteristic, a tactical target characteristic, and an attack pattern characteristic between the specific attack component and the each attack component of the each of the APT attack cases.

4. The operation method of claim 1, wherein the similarity between the specific attack component and the each attack component of the each of the APT attack cases is measured by a Jaccard similarity.

5. The operation method of claim 1, wherein applying a Jaccard similarity identifies the specific APT attack case matching the attack scenario inputted.

6. The operation method of claim 1, wherein recommending the security requirement corresponding to the specific APT attack case further comprises transmitting the security requirement corresponding to the specific APT attack case to an external device.

7. A security requirement recommendation system, comprising:
an input device configured to input an attack scenario of an advanced persistent threat (APT);
an ontology server storing a case-based problem domain ontology including characteristic models of APT attack cases; and
a security requirement recommendation device estimating a specific APT attack case similar to the attack scenario inputted based on the case-based problem domain ontology and recommending a security requirement corresponding to the specific APT attack case,
wherein the security requirement recommendation device comprises:
a component extraction unit extracting a specific attack component by applying the attack scenario to an attack component model;
a similarity measurement unit measuring a similarity between the specific attack component and each attack component of each of the APT attack cases, and listing attack target candidates in an order of greater similarities; and
a security requirement extraction unit analyzing the attack target candidates with a security requirement component model, a risk component model, and a domain component model to estimate the specific APT attack case for the attack target candidates, and extracting the security requirement corresponding to the specific APT attack case.

8. The security requirement recommendation system of claim 7, wherein the characteristic models of the APT attack cases comprises:
the attack component model including information about attacks of the each of the APT attack cases;
the security requirement component model including a security requirement information defined in the each of the APT attack cases;
the risk component model including weakness components by the APT attack cases; and
the domain component model including an element of the attack target.

9. The security requirement recommendation system of claim 7, wherein the similarity measurement unit measures the similarity by assigning a weight to a sibling/parent relationship characteristic, a platform performance characteristic, a tactical target characteristic, and an attack pattern characteristic between the specific attack component and the each attack component of the each of the APT attack cases.

10. The security requirement recommendation system of claim 7, wherein the similarity between the specific attack component and the each attack component of the each of the APT attack cases is measured by a Jaccard similarity.

11. The security requirement recommendation system of claim 7, wherein the similarity measurement unit identifies the specific APT attack case matching the attack scenario inputted by applying a Jaccard similarity.

12. The security requirement recommendation system of claim 7, wherein the similarity measurement unit outputs the similarity on a graph.

13. The security requirement recommendation system of claim 7, wherein the security requirement extraction unit of the security requirement recommendation device extracts and transmits the security requirement corresponding to the specific APT attack case to an external device.

* * * * *